April 21, 1970 H. A. R. WEGENER 3,508,211

ELECTRICALLY ALTERABLE NON-DESTRUCTIVE READOUT FIELD EFFECT TRANSISTOR MEMORY

Filed June 23, 1967 2 Sheets-Sheet 1

INVENTOR
HORST A. R. WEGENER
BY Robert Haase
ATTORNEY

April 21, 1970 H. A. R. WEGENER 3,508,211

ELECTRICALLY ALTERABLE NON-DESTRUCTIVE READOUT FIELD EFFECT TRANSISTOR MEMORY

Filed June 23, 1967 2 Sheets-Sheet 2

INVENTOR.
HORST A. R. WEGENER
BY Robert Haase
ATTORNEY

United States Patent Office 3,508,211

Patented Apr. 21, 1970

3,508,211

ELECTRICALLY ALTERABLE NON-DESTRUCTIVE READOUT FIELD EFFECT TRANSISTOR MEMORY

Horst A. R. Wegener, Carlisle, Mass., assignor to Sperry Rand Corporation, a corporation of Delaware Filed June 23, 1967, Ser. No. 648,414
Int. Cl. G11c *11/40;* H01l *11/14*
U.S. Cl. 340—173 8 Claims

ABSTRACT OF THE DISCLOSURE

A memory applicable for use in digital computers comprising insulated gate field effect transistors for each digital datum memory cell. One of said transistors utilizes silicon nitride as the gate insulating material and has an electrically alterable conduction threshold. The other transistors have a fixed conduction threshold. Additional field effect transistor circuits are provided for the application of voltage pulses to the variable threshold transistor via the fixed threshold transistors to set the threshold value and to sense the value of the set threshold.

BACKGROUND OF THE INVENTION

The utilization of non-destructive readout binary storage elements in digital computers is well known. Generally, it is desired that the storage element be of small size, require low power during reading and writing operations, and that it necessitate the use of minimal interface circuits between the storage element per se and the remainder of the digital computer. Significant progress has been made toward the realization of the aforementioned desiderata but much remains to be done, particularly with the advent of microcircuit devices and techniques in the fabrication of digital computers. Efforts are now being directed towards achieving the goal of an all-microcircuited digital computer utilizing essentially the same basic circuit elements and fabrication processes for every computer component including the memory component.

SUMMARY OF THE INVENTION

The present invention provides a binary storage element which is completely compatible with the use of microcircuit fabrication techniques and devices in digital computers. Said element is an insulated gate field effect transistor whose conduction threshold is electrically alterable by the application of voltage pulses of predetermined amplitude and polarity between the gate electrode and the transistor substrate. It is believed that the aforesaid pulses place charges in the dielectric of the gate in a thin region adjacent the interface between the gate dielectric material and the transistor substrate. The charges become trapped and remain in the dielectric for long periods following the removal of the voltage pulse which created them. The result is a relatively permanent shift in the conduction threshold of the transistor. By the application of high voltage pulses of opposite polarity, binary valued conduction thresholds can be established in the transistor. Upon the application of a predetermined voltage having a value intermediate to said thresholds and the application of a suitable bias to the source and drain, the binary condition of the transistor can be sensed by monitoring the magnitude of the resulting current between the source and drain. The amplitude of the sensing voltage is insufficient to change the preexisting conduction threshold so that non-destructive readout is achieved.

DESCRIPTION OF THE PREFERRED EMBODIMENT

Figure 1A:
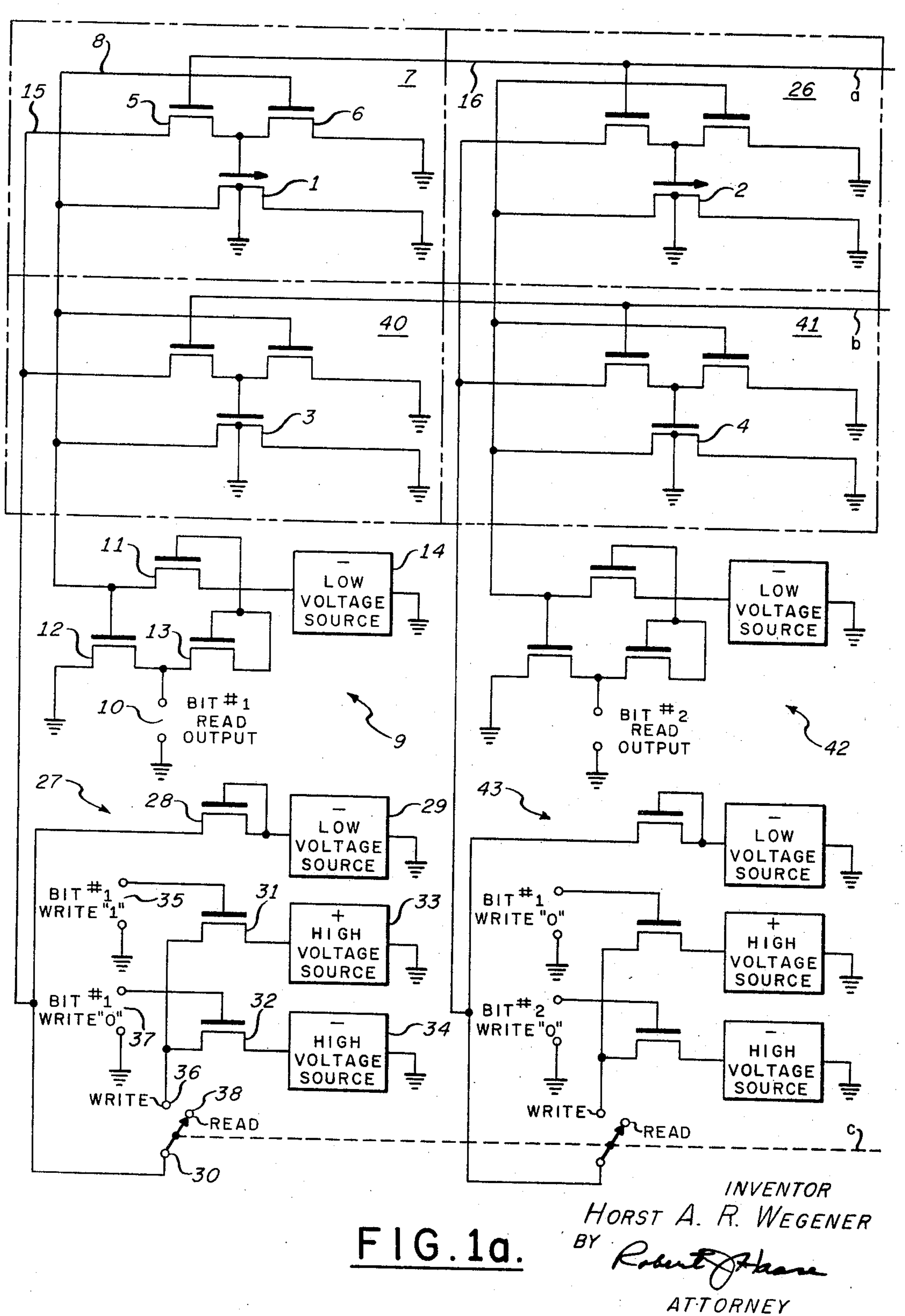
FIGURES 1*a* and 1*b* together comprise a schematic representation of a fully transistorized word-organized memory having provision for two words of two bits each equipped with the memory element of the present invention.
Figure 1B:
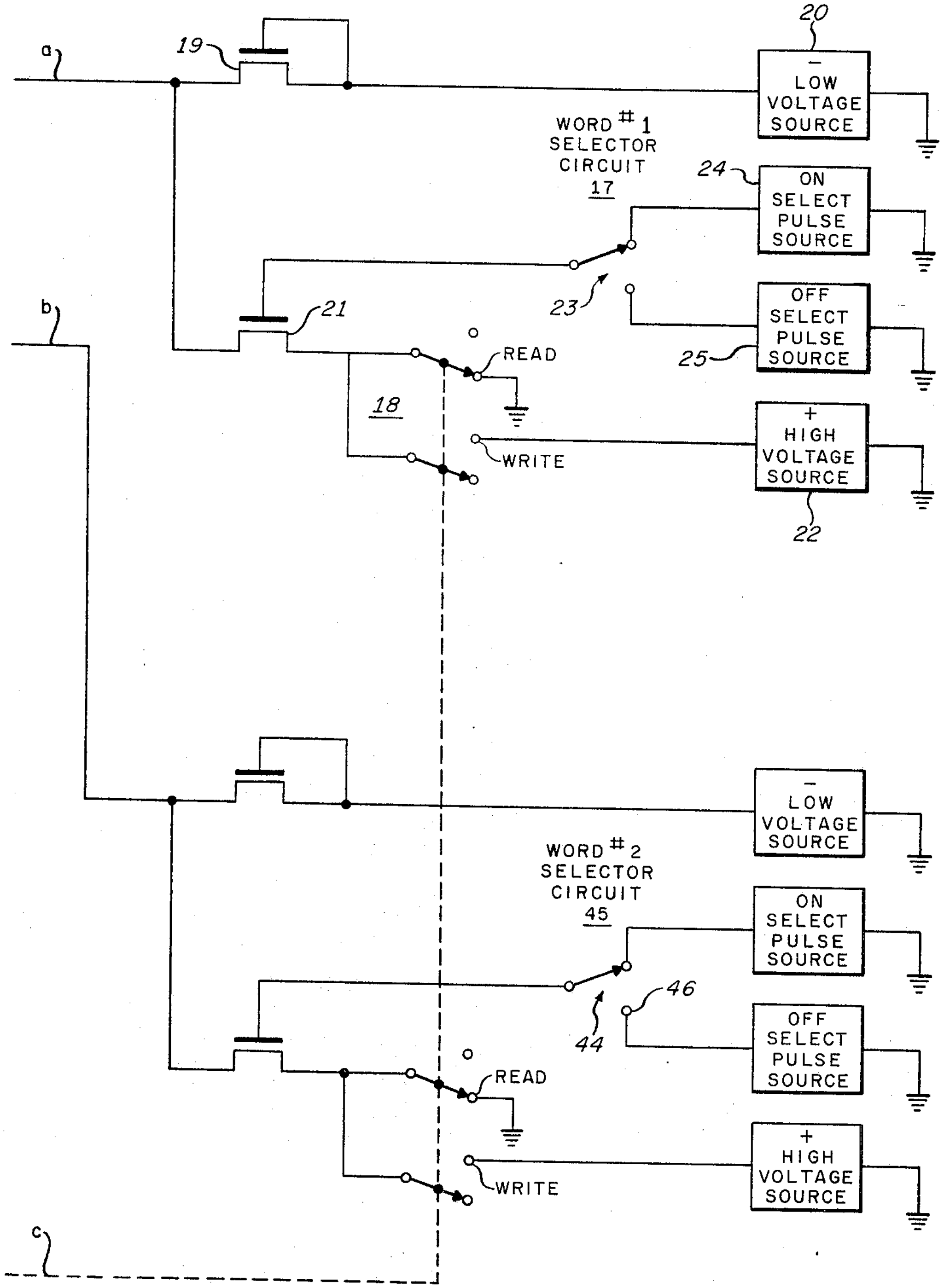

Four variable conduction threshold field effect transsistors 1, 2, 3 and 4 are provided in the word-organized memory represented in FIGURES 1*a* and 1*b* for the storage of two words of binary data, each consisting of two bits, by way of example. The variable threshold is suggested by the arrowhead on the gate electrode symbol. The substrate of each variable threshold transistor is grounded. Each said transistor is in a respective memory cell which further includes two fixed threshold transistors such as transistors 5 and 6 of memory cell 7, i.e., the memory cell provided for bit #1 of word #1. Fully equivalent memory cells 26, 40 and 41 are provided for bit #2 of word #1 and #2, respectively. The source electrode of variable threshold transistor 1 is connected to ground. The drain electrode of transistor 1 is connected via line 8 to reading circuit 9 which provides a signal at output terminals 10, representing the binary state of memory cell 7, in a manner to be described.

Reading circuit 9 comprises three fixed threshold transistors 11, 12 and 13. Transistors 11 and 13 are utilized as resistors by directly connecting the gate electrodes to the respective source electrodes as shown. Field effect transistors are utilized rather than conventional resistors in order to achieve a memory configuration wholly comprised of devices compatible with the same microcircuit fabrication techniques required for the memory elements. The gates and sources of transistors 11 and 13 are connected to negative low voltage source 14. The drain and source electrodes of transistors 12 and 13, respectively, are connected to output terminals 10. The source electrode of transistor 12 is grounded. The gate electrode of transistor 12 and the drain electrode of transistor 11 are connected to line 8.

Returning to memory cell 7, the source and drain electrodes of fixed threshold transistors 5 and 6 are connected in series circuit between line 15 and ground. The gate electrode of variable threshold transistor 1 is connected between the source and drain electrodes of transistors 5 and 6, respectively. The gate electrode of transistor 6 is connected to the drain electrode of transistor 1. The gate electrode of transistor 5 is coupled via line 16 to word #1 selector circuit 17.

Selector circuit 17 functions in a manner determined by the presently desired one of the read and write modes of the memory. In the word-organized memory of the disclosed embodiment, one word at a time is either written into or read out of the entire memory. Hence all of the read-write switches, such as switch 18, are ganged together for simultaneous settings. Switch 18 is positioned as shown for operation in the read mode. Circuit 17 comprises transistor 19 whose drain and gate electrodes are connected together to function as a resistor for connecting line 16 to negative low voltage source 20. Line 16 is also connected to the source electrode of fixed threshold transistor 21 whose drain electrode is connected through switch 18 either to ground or to positive high voltage source 22 (in the latter connection, this electrode actually becomes the source electrode). The gate electrode of transistor 21 is connected through switch 23 either to pulse source 24 or to pulse source 25. Source 24 provides a signal for blocking transistor 21 irrespective of the setting of switch 18. The blocking of transistor 21 causes transistor 5 in memory cell 7 to conduct in either the reading or writing mode because of the conduction bias provided by source 20 and applied via transistor 19 and line 16 to the gate electrode of transistor 5. Source 24 of circuit 17 is designated "on select pulse source" (select function) consistent with its control effect on transistor 5. Similarly, pulse source 25 is designated "off select pulse source" (de-select function) consistent with its opposite control effect on transistor 5. Source 25 biases the gate electrode of the transistor 21 so that it is rendered conductive irrespective of the setting of switch 18.

Whereas the blocking of transistor 21 always is a sufficient condition to cause conduction of transistor 5, the conduction of transistor 21 is not always sufficient to cause non-conduction of transistor 5. As will be seen more fully later, a high positive potential is required to de-select when in the writing mode although ground potential is sufficient to de-select when in the reading mode. Accordingly, switch 18 connects transistor 21 to high voltage source 22 when in the writing mode and to ground when in the reading mode. Thus, memory cell 7 is selected for reading purposes when switches 23 and 18 are in the positions shown and is selected for writing purposes when switch 23 is in the position shown and switch 18 is in the position opposite the one shown. Memory cell 7 is de-selected by moving switch 23 to the position opposite to the one shown. It should be noted that memory cell 26 also is selected by circuit 17 in the same manner as described in the case of memory cell 7 whereby both bits #1 and #2 of word #1 are selected at the same time in accordance with the word organization of the memory.

Line 15 connects transistors 5 and 6 of memory cell 7 to writing circuit 27. Circuit 27 comprises transistor 28 which is connected as a resistor for connecting negative low voltage source 29 to line 15. Circuit 27 further comprises switch 30, fixed threshold transistors 31 and 32, positive high voltage source 33 and negative high voltage source 34. When transistor 31 is rendered conductive by the application of a negative biasing potential to terminals 35 and switch 30 engages write contact 36, the high positive potential of source 33 is applied via line 15 to transistors 5 and 6 of memory cell 7. When a negative biasing potential is applied to terminals 37 rendering transistor 32 conductive and switch 30 is thrown to write contact 36, the high negative voltage of source 34 is applied via line 15 to transistors 5 and 6. When switch 30 engages read contact 38, solely, the potential of source 29 is applied via transistor 28 and line 15 to transistors 5 and 6. The polarities of the voltage sources shown in the figure are those which are required for the operation of the disclosed embodiment in the case wherein the field effect transistors are of the p-channel enhancement mode type, by way of example.

The variable threshold transistors 1, 2, 3 and 4 preferably are obtained through the use of the process described in copending application S.N. 505,380, now abandoned but corresponding to British Patent No. 1,125,650 entitled "Insulating Layers and Devices Incorporating Such Layers" or in copending application S.N. 558,803, now U.S. Patent No. 3,422,321 for "Oxygenated Silicon Nitride Semiconductor Devices and Silane Method for Making Same," filed June 20, 1966, both in the name of Nigel C. Tombs and assigned to the present assignee. The fixed threshold transistors, such as transistors 5 and 6 of the memory cell, preferably are obtained through the use of the process described in copending application S.N. 639,808 for "Silicon Nitride Passivated Semiconductor Devices Having Silicon Oxide Interlayer," filed May 19, 1967, in the names of Frank A. Sewell and Nigel C. Tombs, and assigned to the present assignee. Briefly, the variable threshold transistors comprise a wafer of silicon into which are diffused source and drain junctions in a conventional manner. In the preferred embodiment, a layer of silicon nitride passivates the source and drain junctions and forms the gate electrode insulating layer. In the case of the fixed threshold transistors, a relatively thin silicon oxide interlayer preferably is placed between the silicon substrate and the silicon nitride gate insulating layer. Alternatively, the gate insulting layer may be solely silicon oxide.

The mechanism by which the conduction threshold of the variable threshold transistors is electrically alterable is not completely understood. However, it is believed that traps within the silicon nitride gate dielectric are charged upon the application of a sufficient voltage between the gate electrode and the substrate. These traps are not charged under the same pulse conditions in the case of the fixed threshold transistors having the thin silicon oxide interface layer between the silicon substrate and the silicon nitride. Extensive testing has demonstrated, for example, that whereas the normal conduction threshold voltages of p-channel enhancement mode variable threshold transistors were about −5 volts, the application of a voltage "writing" pulse of about +50 volts amplitude and 100 milliseconds duration to the gate electrode changed the conduction threshold to −1 to −2 volts. Present indications are that very much shorter duration pulses will become sufficient to cause significent shifts in the conduction threshold. Correspondingly, a voltage "writing" pulse of −50 volts and 100 milliseconds duration applied to the gate electrode of the tested transistors changed the conduction threshold to −10 to −12 volts. The minimum voltage necessary to cause a conduction threshold change was found to be roughly 15 to 20 volts. Generally, the magnitude of the threshold change is a function of the amplitude and the duration of the writing pulse. The shifted conduction thresholds were observed to persist for many days following the removal of the gate electrode writing pulse. Thus, memory performance is achieved without the expenditure of any standby power. The value of the shifted conduction threshold at any given time can be sensed by merely applying a "reading" pluse to the gate electrode having an amplitude intermediate the two shifted threshold values (in the case of a binary device), biasing the source and drain electrodes, and monitoring the magnitude of the current flowing between the source and drain electrodes. Amplification is achieved inherently in the reading operation.

Inasmuch as the magnitude of the threshold shift is related to the amplitude, duration and number of the gate "writing" pulses inducing the shift, the variable threshold transistors of the present invention are applicable also for analog storage purposes and as adaptive memory elements. The value of the total analog shift in the conduction threshold can be ascertained by the application of calibrated potentials to the transistor electrodes and determining the value of the resulting source to drain current. The sign of the change in threshold depends upon the polarity of the writing pulse. The threshold actually may be moved through zero to convert a depletion mode device into an enhancement mode device and vice versa. Thus, the memory element of the present invention is a highly versatile one.

In the operation of the disclosed embodiment, writing is accomplished in typical memory cell 7 by placing switch 30 of writing circuit 27 and switch 18 of selector circuit 17 in the write positions and by setting switch 23 of selector circuit 17 to connect pulse source 24 to transistor 21. A low negative potential from source 14 of reading circuit 9 is applied to the gate of transistor 6 causing it to conduct and the same negative potential also is applied to bias the source and drain electrodes of variable threshold transistor 1. Transistor 21 of circuit 17 is turned off by source 24 allowing the negative potential from source 20 to be applied via line 16 to the gate electrode of fixed threshold transistor 5 causing it to conduct. Assuming that the binary value one is to be written in variable treshold transistor 1 of memory cell 7, a signal is applied to terminals 35 of writing circuit 37. Said signal causes transistor 31 to conduct to connect the high positive voltage from source 33 via switch 30 and line 15 across the source and drain electrodes of transistors 5 and 6. Transistor 6 is constructed to have a conduction impedance approximately ten times the conduction impedance of transistor 5. The result is that substantially the entire high positive potential from source 33 is developed across transistor 6 and is impressed upon the gate electrode of variable threshold transistor 1. The high positive potential causes the threshold voltage of transistor 1 to shift to about −1 volt. In the event that it is desired to store the binary value zero in memory cell 7, a signal is applied to terminals 37 causing transistor 32 to conduct and establish a connection between high negative voltage source 34 and transistors 5 and 6. In this case, substantially the entire negative potential is impressed on the gate electrode of variable threshold transistor 1 causing its threshold to shift to about −1 volts.

The value of the binary data stored in memory cell 7 can be read by changing the settings of switches 30 and 18 to the read position. Memory cell 7 is selected for reading purposes when switch 23 of circuit 17 is in the position shown. Writing circuit 27 now provides only a low negative voltage from source 29 for the excitation of transistors 5 and 6, switch 30 being in the open position. The low negative voltage provided by source 14 of reading circuit 9 causes transistor 6 to conduct. The simultaneous conduction of transistors 5 and 6 provides a voltage divider network comprising transistors 28, 5 and 6 between low voltage source 29 and ground. Transistor 28, like transistor 6, is constructed to have a conduction resistance about ten times that of transistor 5 whereby approximately half of the low voltage source potential is developed across transistor 6 and impressed upon the gate electrode of variable threshold transistor 1. The divided-down (for example −5 volts) potential is sufficient to cause conduction of transistor 1 only in the event that its threshold had been shifted to −1 volt in the example given. Thus, transistor 1 conducts only in the event that a binary one had been stored therein. The conduction of transistor 1 causes the potential on line 8 to fall towards zero, precluding the conduction of transistor 12 in reading circuit 9 and allowing the potential of source 14 to appear across bit #1 read output terminals 10. The conduction of transistor 6 is terminated in this case upon the conduction of transistor 1 but this action does not interfere with the production of the full negative output signal at terminals 10. In the event that binary zero had been stored in transistor 1 (represented by a threshold shift to −10 volts), the application of the divided-down potential to the gate electrode of transistor 1 would be insufficient to cause conduction. The lack of conduction in transistor 1 renders transistor 12 in reading circuit 9 conductive, essentially grounding output terminals 10 to provide a signal representing the binary value zero for bit #1 of word #1. The reading and writing of memory cell 26 is accomplished with the air of reading circuit 42 and writing circuit 43 simultaneously with the reading and writing of cell 7. Word #2 is de-selected during the aforesaid operations relating to word #1 by setting switch 44 of word #2 selector circuit 45 to engage contact 46.

As previously mentioned, the gate insulating material used in the variable threshold memory elements preferably is either silicon nitride as described in British Patent No. 1,125,650 or oxygenated silicon nitride as described in U.S. Patent No. 3,422,321. Accordingly, the term "silicon nitride" as used in the appended claims is intended to cover both materials.

While the invention has been described in its preferred embodiment, it is to be understood that the words which have been used are words of description rather than limitation and that changes within the purview of the appended claims may be made without departing from the true scope and spirit of the invention in its broader aspects.

I claim:

1. A memory circuit comprising an insulated gate field effect transistor having source, drain and gate electrodes formed on a substrate, said transistor having a plurality of different conduction thresholds established by a respective plurality of different voltage pulses having values above a certain magnitude applied between said gate electrode and said substrate, means for applying a first voltage pulse between said gate electrode and said substrate having a value above said magnitude to establish one of said thresholds, means for applying a predetermined second voltage to said gate electrode having a value below said magnitude, means for biasing said source and drain electrodes, and means for monitoring the amount of current flowing through said source and drain electrodes in response to said second voltage.

2. A circuit as defined in claim 1 wherein said field effect transistor is formed on a silicon substrate and said gate electrode is insulated from said substrate by silicon nitride.

3. A memory circuit comprising an insulated gate field effect transistor having source, drain and gate electrodes formed on a substrate, said transistor having a pair of conduction thresholds established by a respective pair of voltage pulses having values above a certain magnitude applied between said gate electrode and said substrate, means for applying a first voltage pulse between said gate electrode and said substrate having a value above said magnitude to establish one of said thresholds, means for applying a second voltage pulse between said gate electrode and said sustrate having a value above said magnitude to establish the other of said thresholds, means for applying a predetermined third voltage to said gate electrode having a value intermediate said thresholds, means for biasing said source and drain electrodes, and means for monitoring the amount of current flowing through said source and drain electrodes in response to said third voltage.

4. A circuit as defined in claim 3 wherein said field effect transistor is formed on a silicon substrate and said gate electrode is insulated from said substrate by silicon nitride.

5. A memory circuit as defined in claim 3 wherein said first and second voltage pulses are of opposite polarities.

6. A circuit as defined in claim 3 and further comprising an insulated gate field effect transistor having source, drain and gate electrodes and a fixed conduction threshold, said first, second and third potentials being applied between said gate electrode and said substrate of said variable threshold transistor through said source and drain electrodes of said fixed threshold transistor, and means connected to said gate electrode of said fixed threshold transistor for controlling the conduction thereof.

7. A circuit as defined in claim 6 wherein said fixed threshold transistor is formed on a silicon substrate and said gate electrode of said fixed threshold transistor is insulated from said substrate of said fixed threshold transistor by a layer of silicon oxide.

8. A circuit as defined in claim 6 wherein said fixed threshold transistor is formed on a silicon substrate and said gate electrode of said fixed threshold transistor is insulated from said substrate of said fixed threshold transistor by a layer of silicon oxide on said substrate and a layer of silicon nitride on said layer of silicon oxide.

(References on following page)

References Cited

UNITED STATES PATENTS

| | | | |
|---|---|---|---|
| 2,592,683 | 4/1952 | Gray | 340—173 X |
| 2,791,760 | 5/1957 | Ross | 317—235 X |
| 2,791,761 | 5/1957 | Morton | 340—173 |
| 3,373,295 | 3/1968 | Lambert | 307—238 |
| 3,388,292 | 6/1968 | Burns | 340—173 X |

| | | | |
|---|---|---|---|
| 3,422,321 | 1/1969 | Tombs | 317—235 |
| 3,428,875 | 2/1969 | Snow | 317—235 |

BERNARD KONICK, Primary Examiner

J. F. BREIMAYER, Assistant Examiner

U.S. Cl. X.R.

307—238, 304